June 26, 1951     B. B. BROWN     2,558,232
DEVICE FOR REFACING SEATS IN
LAWN MOWER REEL PINION GEARS
Filed May 16, 1947     2 Sheets-Sheet 1
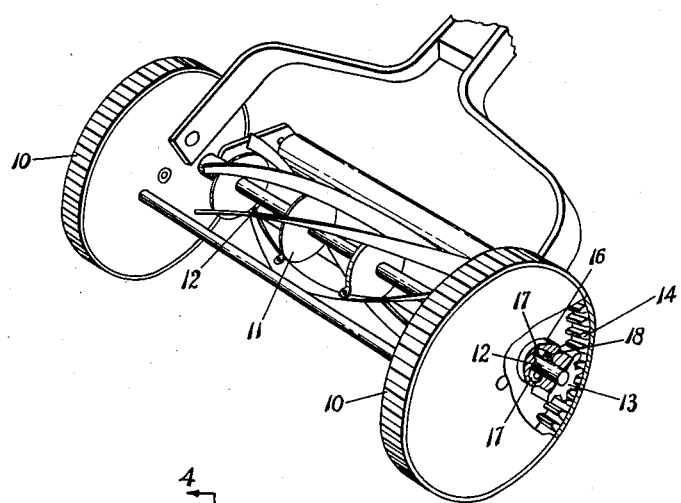
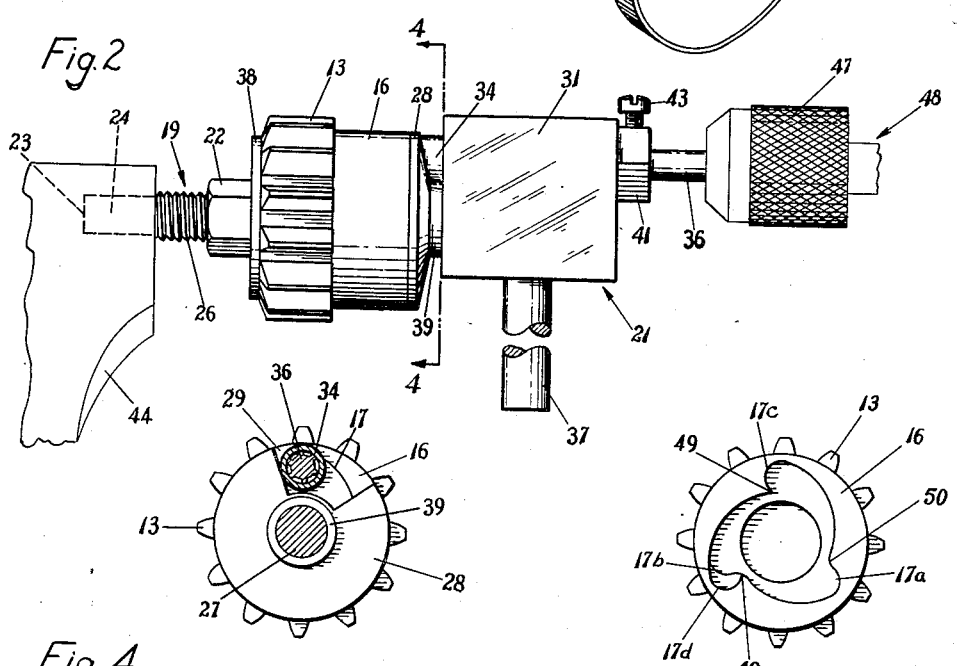
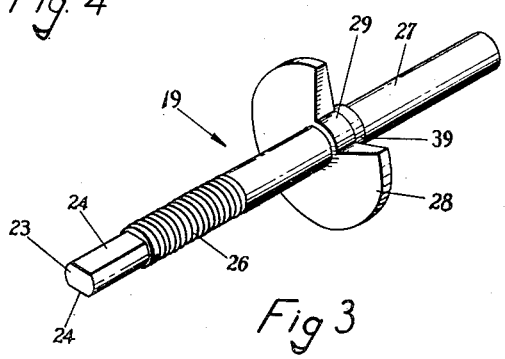
INVENTOR
Benton B. Brown
BY
Rudolph L. Lowell
ATTY.

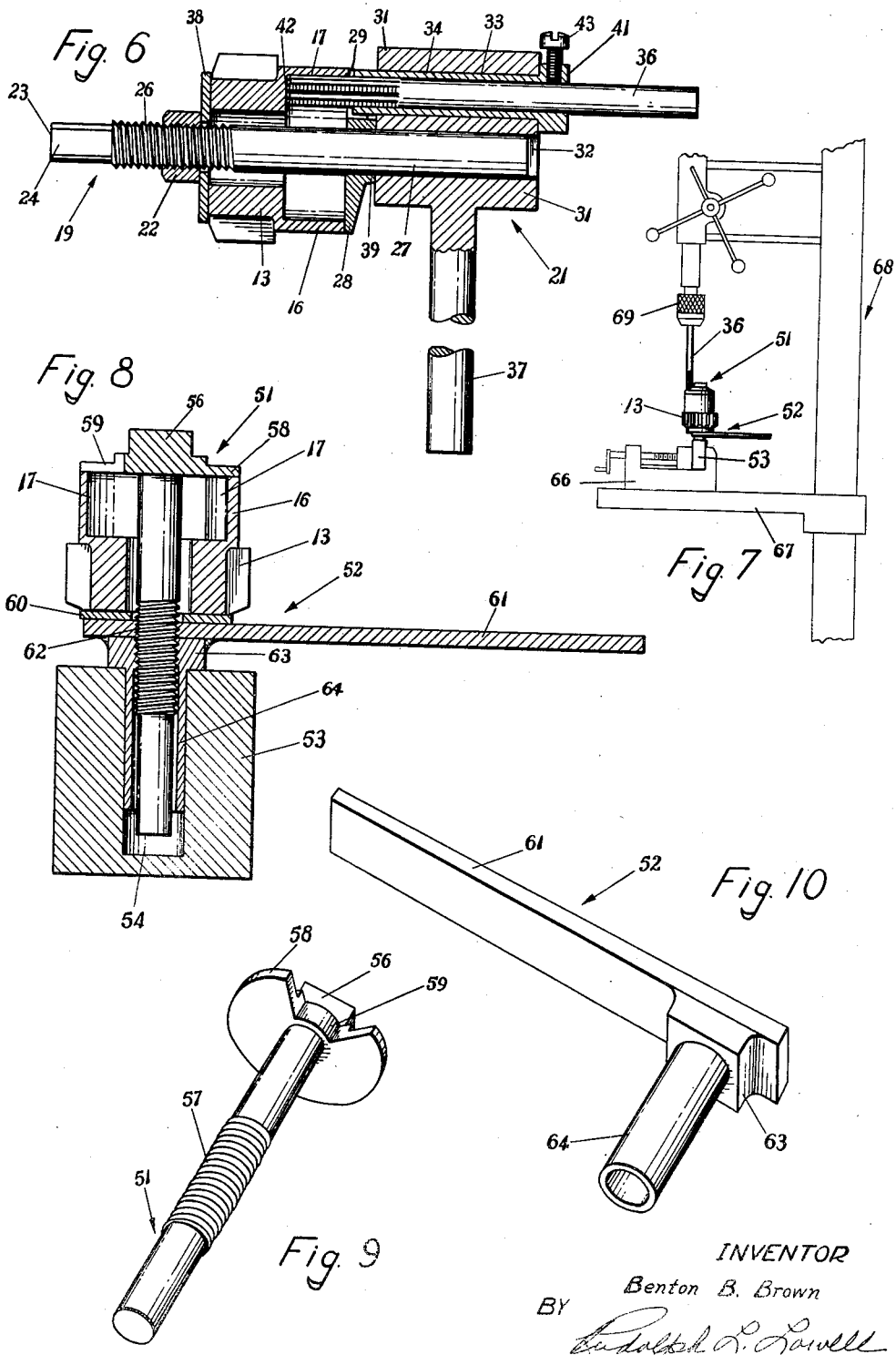

Patented June 26, 1951

2,558,232

UNITED STATES PATENT OFFICE 2,558,232

DEVICE FOR REFACING SEATS IN LAWN MOWER REEL PINION GEARS

Benton B. Brown, Des Moines, Iowa

Application May 16, 1947, Serial No. 748,456

5 Claims. (Cl. 90—11)

This invention relates generally to seat refacing devices and in particular to a device for refacing a dog seat formed in one end of a pinion gear for driving the reel of a lawn mower.

A large number of lawn mowers now in common use generally include a ground wheel which is in driving connection with the cutting reel by means including pinion gears mounted on the ends of the reel shaft, and driven from internal gear sections formed on the ground wheels. Each pinion gear has a hub at one end formed with a series of spaced axially extended dog seats adapted to engage a dog, in the general form of a pin, extended through the reel shaft for transverse movement relative to the shaft. On rotation of the ground wheel in a forward direction, the dog is engageable with one of the seats in the pinion gear to connect the pinion with the reel shaft. When the rotation of the ground reel is reversed, the dog merely rides over the seats to disconnect the reel. As a result, the reel is operated only when the lawn mower is advanced.

When the dog seats become worn, the dog on the reel shaft rides over the pinion seats, regardless of the direction of movement of the lawn mower, so that the cutting reel is effectively rendered inoperative. In the event the dog at only one end of the reel shaft rides over its corresponding pinion seats, a drag or pull action, on advance movement of the mower, takes place at the engaged dog, so as to interfere with the tractability and guidance of the mower.

The pinion gears for different types of lawn mowers vary somewhat as to size, so that when the dog seats become worn considerable difficulty is encountered in replacing the pinion due to the fact that pinions for all makes of mowers are not generally maintained in stock by any one lawn mower repair shop. A general object of the present invention, therefore, is to provide a device, adapted to be used by repair shops or traveling repair men, which is capable of being applied to a wide variety of pinions for the purpose of refacing worn dog seats. The pinion can thus be quickly refaced and replaced so as to eliminate the time and expense required in replacing the worn pinion with a new pinion.

A further object of this invention is to provide an improved refacing device for lawn mower pinion gears.

Another object of this invention is to provide a refacing device for a lawn mower reel pinion, which is of a simple construction, comprised of a relatively few number of parts, and efficient in operation to properly reface the worn dog seats in the pinion.

A feature of this invention is found in the provision of a refacing device for a lawn mower reel pinion, in which the pinion is coaxially mounted on a shaft member. A rotatable cutting or facing tool is supported in a spaced parallel relation with the shaft and extends within the seat to be refaced. Means are provided to accomplish a relative pivotal movement of the gear and the cutting tool, with respect to the axis of the shaft member, to feed the cutting tool against the seat to be refaced.

Further objects, features and advantages of this invention will appear from the following description when taken in connection with the accompanying drawings, in which:

Fig. 1 is a perspective view of the head of a lawn mower with certain parts broken away to show the assembly of the reel drive pinion;

Fig. 2 is a side elevational view of the pinion facing device of this invention in operative assembly relation with a pinion to be faced;

Fig. 3 is a perspective view of a combination clamp and shaft member which forms part of the device shown in Fig. 2;

Fig. 4 is a transverse sectional view as seen on the line 4—4 in Fig. 2;

Fig. 5 is an end elevational view of a pinion gear showing a refaced dog seat, a dog seat partially refaced, and a worn dog seat;

Fig. 6 is a vertical longitudinal sectional view of the refacing device shown in Fig. 2;

Fig. 7 is a side elevational view of a modified form of the invention adapted to be power-operated, and shown in operative relation with a usual type drill press;

Fig. 8 is an enlarged vertical longitudinal sectional view of the device illustrated in Fig. 7; and Figs. 9 and 10 are detail perspective views of a combination clamp and shaft member, and a feed member, respectively, which are embodied in the device shown in Figs. 7 and 8.

With reference to the drawings, there is illustrated in Fig. 1 a lawn mower head of a usual type which includes ground wheels 10 and a cutting reel 11 having a shaft 12. Mounted at the opposite ends of the reel shaft are pinion gears 13 adapted for meshing engagement with internal gears 14 formed in the wheels 10. Each gear 13 is formed at its inner end with a hub 16 provided with angularly spaced axially extended seats 17, illustrated as three in number.

The pinion gears 13 are freely rotatable on the shaft 12 and are connected and disconnected with the shaft, on reverse movement of the mower, by dogs 18, of a pin form, loosely extended transversely through the shaft and engageable with one of the seats 17 in the hubs 16 when the mower is advanced.

The device of this invention is adapted to reface the seats 17, after they have become worn, and as shown in Figs. 2 and 6 includes a combination clamp and shaft unit 19, a feed unit 21 and a clamping nut 22. The combination unit 19 (Figs. 3 and 6) is comprised of a rod formed at one end 23 with a pair of oppositely arranged flat surfaces 24, and an adjacent threaded section 26; with the remaining length of the rod being smooth and constituting what shall hereinafter be referred to as a shaft section 27. Intermediate the ends of the shaft section 27 is a flange or disc member 28 formed with a notch or cut away portion 29 for a purpose to appear later.

The feed unit 21 (Figs. 2 and 6) includes a bearing block 31, of a substantially flat rectangular shape, provided with a pair of longitudinally extended bores 32 and 33. The bore 32 is adapted to rotatably receive the shaft section 27 and the bore 33 rotatably supports a sleeve member 34 for a ream 36. A handle 37, integral with the bearing block, is extended laterally from one of its sides in a direction radially of the bores 32 and 33.

In the use of the refacing device a pinion gear 13 (Fig. 6) is slipped over the threaded section 26, of the combination unit 19, until its hub 16 is in engagement with the disc 28. At this position a part of the threaded section 26 extends outwardly from the gear 13. A washer 38 is then mounted about the unit 19 against the gear 13, and the nut 22 is threaded on the section 26 to firmly clamp the gear 13 against the disc 28. During this clamping action the notch 29, in the disc 28, is arranged to overlie one of the seats 17 in the gear hub 16, as illustrated in Fig. 4.

The block 31 is rotatably supported on the shaft section 27 at the bore 32, and is moved to a position at which its inner end is in bearing engagement with a reduced section 39 formed on the disc 28. The ream sleeve 34 is then positioned within the bore 33 to a position defined by the engagement of a bearing flange 41, at its outer end, with the outer side of the bearing block 31. The ream 36 is inserted within the sleeve until its inner or working end abuts or contacts the inner end 42 of the seat 16 to be refaced. The sleeve 34 is then fixed on the ream by a lock screw 43 threadable in the sleeve flange 41, and adapted to hold the ream in its adjusted position, against inward axial movement.

It is seen, therefore, that the gear 13 is clamped in a fixed position concentric with the shaft section 27 and that the ream 36 extends through the notch 29 for reception in the hub 16 at a spaced parallel position from the shaft section 27, predetermined by the spacing between the bores 32 and 33, to provide for a proper refacing of a worn seat.

With the device thus relatively assembled, the flat surfaces 24 at the end 23 of the combination unit 19, are gripped between the jaws of a vise 44 (Fig. 2) such that the unit 19 lies in a substantially horizontal plane. The ream 36 is then gripped in a chuck 47 of a usual type brace 48 so as to be rotated thereby. The brace 48 is manipulated with one hand, while the handle 37 on the bearing block 31 is gripped by the other hand. Concurrently with the rotation of the ream 36, pressure is applied on the handle 37 to rotate the ream relative to the shaft section 27 in a direction such that the ream is forced against the seat 17 to be refaced. This operation is continued until a worn seat 17 has been refaced to a proper depth.

Thus, for the purpose of illustrating the operation of the device of this invention, there is shown in Fig. 5 a pinion gear 13 having the seats thereof indicated as 17a, 17b and 17c. The seat 17a designates the general appearance of a worn seat, in which the stop or shoulder portion 50 is of a rounded or smooth contour so as to be ineffective for engaging the dog 18. In other words, the dog 18, on a forward movement of the mower, merely rides over the shoulder 50. When all of the seats in a pinion are thus worn the dog 18 is incapable of connecting the reel shaft 12 in driven engagement with the pinion gear 13.

The seat 17b is a worn seat which has been partially refaced, as designated at 17d, to form a sharp shoulder or stop 49 of a generally concave shape capable of engaging the pinion dog 18. The portion included between the worn seat 17b and the refaced seat portion 17d, is thus removed during a refacing operation. The seat 17c shows a completely refaced worn seat.

When a first seat 17 has been refaced, the bearing unit 21, while assembled with the brace 48, is removed from the shaft section 27. The clamp nut 22 is then loosened to provide for the movement of the gear 13 to a position such that a next seat 17 to be refaced underlies the notch 29 in the disc 28. The nut 22 is then tightened, the bearing unit 21 is replaced, and the above described operation is repeated.

Figs. 7 and 8 show a modified form of the invention providing for a power operation of the ream 36. This form of the invention includes a combination shaft and clamp unit 51, a combination clamp and handle member 52, and a bearing block 53 of a flat rectangular shape formed with a central bore 54.

The combination unit 51 (Figs. 8 and 9) is of a rod form having a square head 56 at one of its ends and a threaded section 57 intermediate its ends. A disc member 58, formed with a notch 59, is arranged against the head 56.

The member 52 (Figs. 8 and 10) includes a handle 61 formed at one end with a threaded opening 62 which is in axial alignment with a nut 63 secured to one side of the handle and provided with a sleeve extension 64 which is rotatably receivable in the bore 54.

In use, a pinion gear 13 is mounted on the combination unit 51 so that the hub 16 is positioned against the disc 58, with one of the seats 17 in the hub in an underlying position with the disc notch 59. A washer 56 is then moved against the gear 13 and the member 52 is then threaded on the section 57 so that the nut 63 and sleeve 64 extend outwardly from the gear 13. By holding the head 56 with a wrench or the like, and manipulating the handle 61, the gear 13 is firmly clamped between the disc 58 and the handle 61 in a concentric relation with the combination unit 51. The sleeve 64 is then inserted within the bore 54 and the bearing block 53 clamped between the jaws of a usual type vise 66 adapted to be carried on the work table 67 of a drill press 68.

With the ream 36 arranged in the chuck 69 of the drill press, the vise 66 and ream are relatively adjusted to provide for the location of the ream within a seat 17 to be refaced. On operation of the drill press the handle 61 is moved in a direction to press the seat being refaced against the ream 36.

When a first seat has been refaced, the ream 36 is moved upwardly away from the device, and the assembly of the unit 51, member 52 and gear 13 removed from the bearing block 53. On loosening of the member 52 the gear 13 is moved to a position such that a second seat 17 to be refaced underlies the notch 59 in the disc 58. The refacing operation described above is then repeated.

From a consideration of the above description, it is seen that the invention provides a device for refacing worn seats in the pinion gears for the cutting reel of a lawn mower, which is of a simple and compact construction, readily applicable to pinion gears of varying types, capable of being easily and quickly assembled relative to a gear to be refaced, and efficient in operation to completely reface the worn seats in a pinion gear. Further, the device may be hand or power operated to provide for its use by a journeyman repair man or in a mower repair shop.

Although the invention has been described with respect to several embodiments thereof, it is to be understood that it is not to be so limited since changes can be made therein which are within the full intended scope of this invention, as defined by the appended claims.

I claim:

1. A device for refacing a dog seat formed in one end of a pinion gear for driving the reel of a lawn mower comprising, a shaft member adapted to be extended through the bore in said pinion gear, a flange member fixed adjacent one end of said shaft and adapted to engage the one end of said gear, said flange member having an opening therein positionable opposite said dog seat, a clamp member movably supported on the other end of said shaft member and adapted to be moved against the other end of said gear to clamp said shaft against movement relative to said gear, a rotatable cutting tool extended through said flange opening and extended longitudinally of said shaft member, and means supporting said cutting tool for pivotal movement about said shaft member.

2. A device for refacing a dog seat formed in one end of a pinion gear unit for driving the reel of a lawn mower comprising, a clamp means including a shaft member extendible through the bore in said gear unit, a clamp member on said shaft engageable with the one end of said gear unit, and having an opening therein positionable opposite said dog seat, means on said shaft movable against the other end of said gear unit to hold said shaft against movement relative to said gear unit, a rotatable cutting unit extendible through said opening in a spaced parallel relation with said shaft, and means providing for a pivotal movement of one of said units relative to the axis of said shaft member during a cutting operation.

3. A device for refacing a dog seat formed in one end of a pinion gear for driving the reel of a lawn mower comprising, a shaft extendible through the bore in said gear, a clamp member mounted on said shaft intermediate the ends thereof adapted to engage the one end of said gear, the clamp member having an opening therein positionable opposite said seat, a second clamp member movably carried adjacent one end of said shaft and engageable with the opposite end of said gear to hold said shaft in a fixed position relative to said gear, a body member rotatably supported on the other end of said shaft member, a cutting tool rotatably supported on said body member in a spaced parallel relation with said shaft, and means for rotating said body member on said shaft member.

4. A device for refacing a dog seat formed in one end of a pinion gear for driving the reel of a lawn mower comprising, a shaft member extendible through the bore in said gear, a disc spaced inwardly from one end of said shaft adapted to engage the one end of said gear, said disc having an opening therein positionable opposite said dog seat, means at the other end of said shaft for clamping said disc against the one end of said gear, a body member pivotally supported on the one end of said shaft, means for holding said shaft against rotation, a rotatable cutting tool supported on said body member in a spaced parallel relation with said shaft and projected through said disc opening to a position within said seat, and a handle on said body member for pivotally moving said body member relative to said gear.

5. A device for refacing a dog seat formed in one end of a pinion gear for driving the reel of a lawn mower comprising, a shaft member extendible through the bore in said gear, a disc mounted adjacent one end of said shaft adapted to engage the one end of said gear, said disc having an opening therein positionable opposite said seat, and said shaft being formed with a threaded portion arranged outwardly from the other end of said gear, a clamping member threadable on said threaded portion against the other end of said gear to hold said shaft in a fixed position relative to said gear, a stationary body member adapted to rotatably support the opposite end of said shaft, a rotatable cutting tool extendible through said disc opening in a spaced parallel relation with said shaft, and means on said clamping member for rotating said shaft to provide for the movement of said gear relative to said cutting tool.

BENTON B. BROWN.

REFERENCES CITED

The following references are of record in the file of this patent:

UNITED STATES PATENTS

| Number | Name | Date |
| --- | --- | --- |
| 766,713 | Loetzer | Aug. 2, 1904 |
| 1,288,979 | Pattison | Dec. 24, 1918 |